United States Patent [19]
Elson et al.

[11] 3,724,516
[45] Apr. 3, 1973

[54] GAS DISPENSER AND INFLATION GAUGE

[75] Inventors: Edward E. Elson, Anaheim; Kenneth L. McQuary, Marina Del Rey; George H. Karlin, Beverly Hills; Bert Lane, Palm Springs, all of Calif.

[73] Assignee: Automatic Helium Balloon Systems, Inc., Beverly Hills, Calif.

[22] Filed: Apr. 23, 1971

[21] Appl. No.: 136,899

[52] U.S. Cl.................................141/95, 33/159
[51] Int. Cl...............................................B65b 1/30
[58] Field of Search..........141/10, 67, 68, 94, 95, 96; 33/143 D, 159; 73/409; 128/DIG. 12, 214 E

[56] References Cited
UNITED STATES PATENTS

| 3,589,412 | 6/1971 | Levenson et al. | 141/95 |
| 1,852,485 | 4/1932 | Sidon | 33/159 |
| 3,557,789 | 1/1971 | Poitras | 128/214 E |
| 2,435,644 | 2/1948 | Beckett et al. | 33/143 D |
| 2,650,437 | 9/1953 | Glynn | 33/143 D |

*Primary Examiner*—Houston S. Bell, Jr.
*Attorney*—Mahoney, Hornbaker & Schick

[57] ABSTRACT

A portable dispenser for gaseous fluids such as, for example, helium and inflation gauge whereby the inflatable article, as for example a balloon, may be easily filled with helium and the gauge positioned so as to indicate the extent to which the balloon is being inflated, thereby preventing excessive helium use and possible bursting of the balloon.

10 Claims, 7 Drawing Figures

INVENTORS.
KENNETH L. McQUARY
EDWARD E. ELSON
GEORGE H. KARLIN
AND BERT LANE
BY MAHONEY, HORNBAKER
AND SCHICK
ATTORNEYS

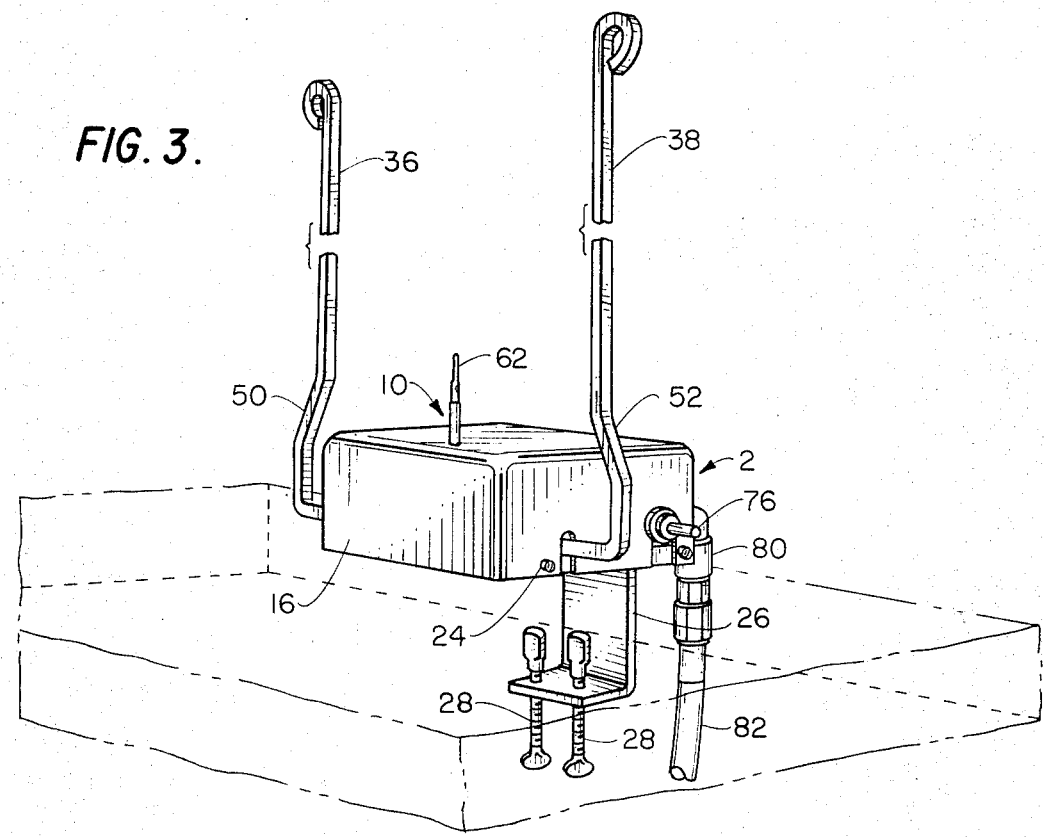
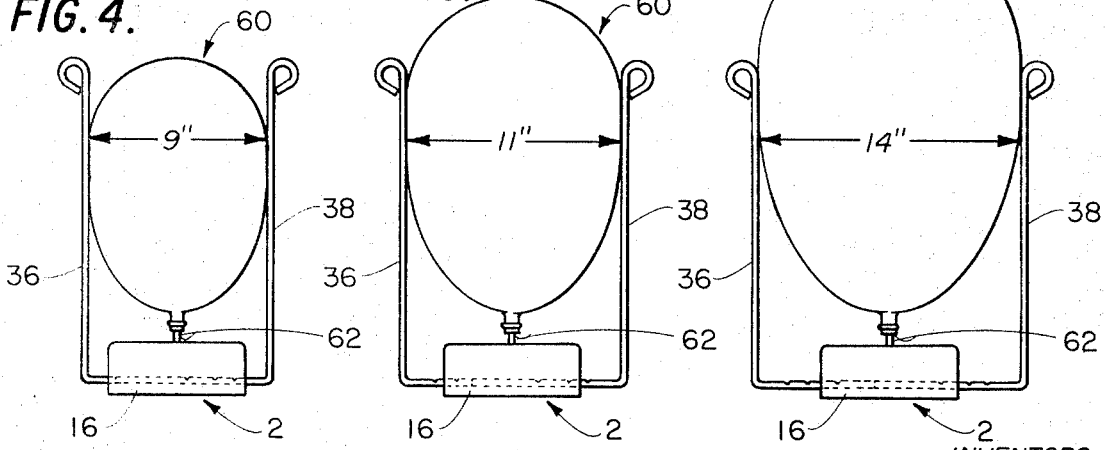
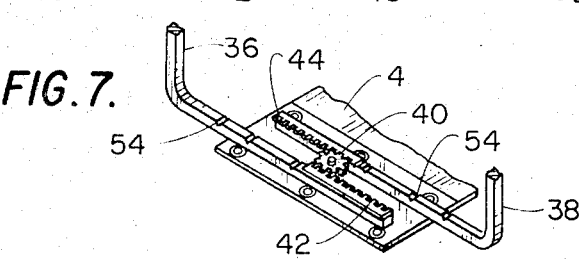

GAS DISPENSER AND INFLATION GAUGE

BACKGROUND OF THE INVENTION

This invention pertains to a device which is portable in nature and comprises a dispenser for dispensing gaseous fluids and an inflation gauge for measuring the size of an inflatable article being inflated by the dispenser.

Generally speaking the hereindescribed invention has application to the inflation and measuring of the degree of inflation of any type of inflatable article but is specially directed to the dispensing of helium and the filling of balloons. More specifically, it is contemplated that the dispenser be equipped with a particular type of filling nozzle and the balloon to be inflated with a particular type of coacting valve of the type for example, disclosed in copending application of Edward E. Elson, and Bert Lane, Ser. No. 825,690, entitled Inflatable Article Valve now abandoned and replaced by continuation-in-part application entitled "Inflatable Article Valve," Ser. No. 141,711, filed May 10, 1971.

Oftentimes in the past a balloon vendor has had to manually hold a balloon mouth over a filling tube or nozzle from a cylinder of gaseous fluid, such as helium, with one hand and turn a valve with the other hand and allow helium to be introduced into the balloon until such time as the operator felt that a sufficient amount of gas had been introduced. Other devices, of a more sophisticated nature, allowed the disposition of the neck of a balloon over a filling mandrel and simple depression thereof to allow the helium to enter the balloon. Here again however, the test as to the degree of inflation was wholly subjective with the operator. Many times, not having some concrete standard to go by, an excess amount of helium was introduced into the balloon thereby causing it to burst, or alternatively, where the balloon did not burst, more helium than was necessary was utilized.

With the herein disclosed invention, a dispensing unit having an integral inflation gauge provides ease of filling inflatable articles and a standard as to the degree of inflation thereof, thereby obviating the above difficulties normally found in the prior art devices.

OBJECTS AND SUMMARY OF THE INVENTION

It is an object of this invention to provide a dispenser for gaseous fluids and inflation gauge for inflatable articles.

It is another object of this invention to provide a portable dispenser for gaseous fluids and an integral inflation gauge whereby inflatable articles being inflated by the dispenser may be measured as to their degree of inflation.

It is still another and further object of this invention to provide a dispenser for gaseous fluids and an inflation gauge which is portable in nature and which may be easily used with a source of gaseous fluid.

It is still another and more specific object of this invention to provide a gaseous fluid dispenser having an inflation nozzle wherein an inflation gauge means is positioned adjacent said nozzle to indicate the degree of inflation of the inflatable article being inflated.

It is still a more specific and further object of the invention to provide a gaseous fluid dispenser having a filling nozzle which is positioned intermediate to extending arms which form therebetween a retaining space of variable size within which the inflatable article is inflated.

It is still a more further specific object of the invention to provide a helium dispenser for inflating balloons with helium wherein a pair of opposed arms operatively connected between a rack and pinion arrangement may be selectively positioned in one of a plurality of positions to thereby indicate the degree of inflation of the balloon.

These and other further objects of the invention will become apparent from the following commentary taken in conjunction with the drawings.

In an exemplary embodiment, the invention generally pertains to a dispenser for gaseous fluids and inflation gauge for inflatable articles comprising the combination of a base and a filling nozzle supported from the base and adapted to receive the mouth of an article to be inflated. Conduit means are connected to the filling nozzle and are adapted to be connected to a source of gaseous fluid. A valve means is operatively connected in the conduit means to put the source of gaseous fluid and the filling nozzle in communication with one another. An inflation gauge means adjacently supported to the filling nozzle completes the essential components of the device and provides a visual indication of the degree of inflation of the inflatable article being inflated.

BRIEF DESCRIPTION OF THE DRAWINGS

FIG. 3 is a fragmentary, perspective view of another embodiment of the devices of this invention.

FIGS. 4, 5 and 6 illustrate the mode in which the devices of this invention operate, and FIG. 7 is a fragmentary showing of the manner in which the inflation gauge component of the devices operate.

DESCRIPTION OF THE BEST EMBODIMENTS CONTEMPLATED

Figure 1:
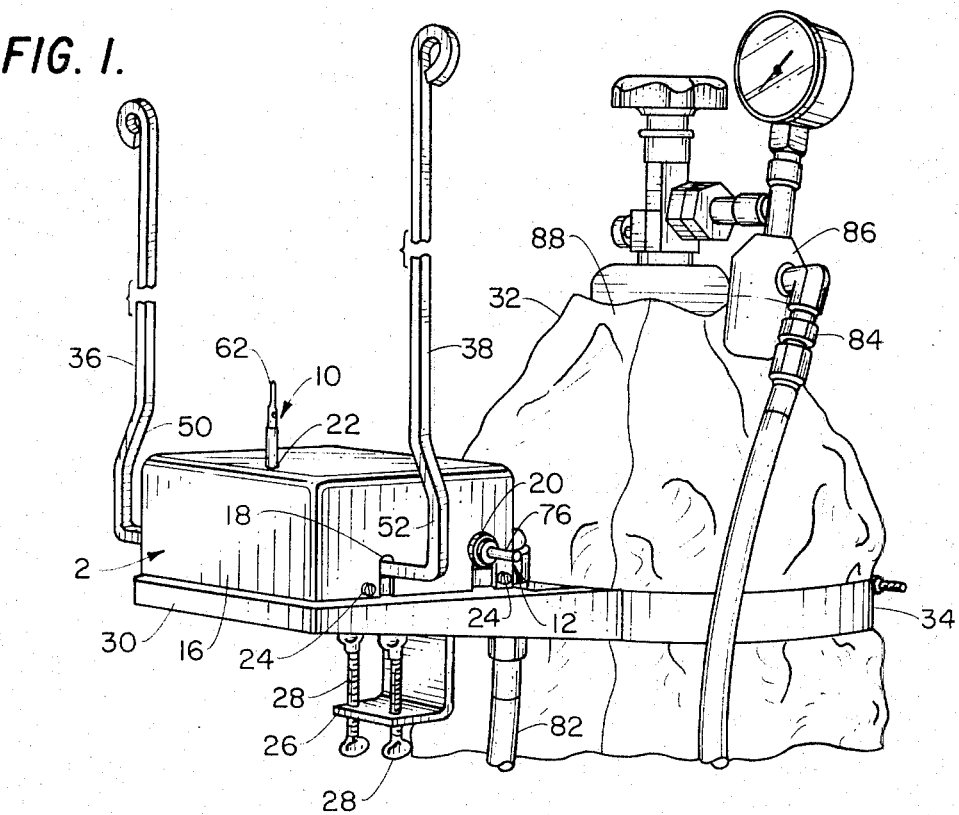
FIG. 1 is a fragmentary, perspective view of one of the devices of this invention for use with a cylinder of helium.

Referring now to the drawings, the devices of this invention will now be described with respect to the basic mechanism which is adaptable to be mounted on a platform which in turn may be secured to a cylinder of gaseous fluid or which may be secured to a table-like surface or counter.

Generally, the basic device 2 comprises a base plate 4 preferably of metal or the like, secured to a housing base plate 6 by means of machine screws 8 or other means well-known in the art. Base 4, here rectangular in shape, is of sufficient size to accommodate filling nozzle assembly 10, valve member 12 and gauge mechanism 14. Housing cover 16 is of the same rectangular configuration as the housing base 6 and is provided with side slots 18 to accommodate the gauge mechanism, the slot 20 to permit manipulation of the valve means 12 and an upper aperture 22 to allow at least the upper portion of the nozzle assembly 10 to project thereabove. Housing cover 16 is retained in place by means of screws 24 or other well-known means in the art.

Secured to both the housing base 6 and support base 4 is an L-shaped clamp 26 having thumb screws 28 for securing the device 2 to a mounting platform adapted to be secured to a tank or cylinder of helium, or alternatively, to a flat surface such as table illustrated in phantom lines in FIG. 3. The clamp may be rotated 90° to permit mounting on a vertical surface or replace by an adapter plate for permanenting mounting. The function of clamp 26 and thumb screws 28 are well known in the art and need not be discussed in detail herein.

Figure 2:
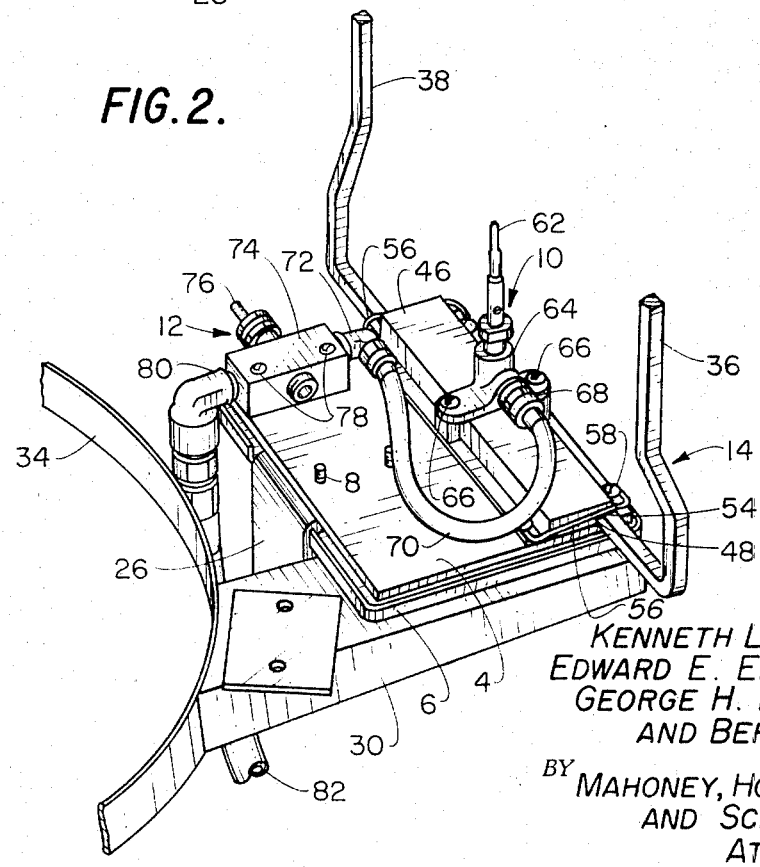
FIG. 2 is a fragmentary, perspective view of the device shown in FIG. 1 with the housing removed for purposes of clarity.

In the FIG. 1 and FIG. 2 embodiment, the basic device 2 as illustrated as being mounted securely by means of clamp 26 and thumb screws 28 to the platform 30, which is secured around a cylinder 32 of helium by means of metal strap 34 in a manner which forms no part of this invention.

The inflation mechanism 14 comprises, in this instance, two upstanding arms 36 and 38 cooperatively connected through a rack and pinion arrangement as seen in FIG. 7. A pinion or gear 40 is rotatably mounted to base plate 4 and a gear surface, meshing with gear 40, is provided on the opposed surfaces 42 and 44 of arms 36 and 38 respectively, as shown in FIG. 7.

To maintain the arms 36 and 38 in operative relationship, a retaining cover 46 (FIG. 2) is provided having aligned slots 48 to receive the respective arms 36 and 38 and guide them in their movement with respect to one another. Thus, with the cover 46 in place, the arms 36 and 38 may move towards and away from one another through the rack and pinion arrangement. It will be noted that the arms 36 and 38 are laterally offset from one another by the distance of the gear's 40 diameter. Each of the arms 36 and 38 are also individually vertically offset as at 50 and 52 to allow for clearance of the housing cover 16. Outward movement is properly limited so as not to disengage the intermeshing gear and surface. Inward movement is limited by retaining cover 46.

The inflation gauge arms 36 and 38 have elongate portions extending upwardly a sufficient distance above the nozzle assembly 10 to provide a space therebetween which is variable in a manner which will be described. The ends of the arms 36 and 38 are ideally curvilinear so as to keep any sharp edges (where the arms are fabricated of metal) away from the inflatable article which is to be inflated therebetween. In some instances a single arm will provide the gauging function.

It will be noted (FIG. 7) that the upper surface of each of the arms 36 and 38 is provided with a plurality of spaced indents 54 which coact with wire springs 56 secured on opposite ends of retaining cover 46 by means of screws 58. The springs 56 slide along and engage the upper surfaces of each of the arms 36 and 38, and upon movement of the arms 36 and 38 to and away from one another, the springs 56 fall into and frictionally engage a selected one of detents 54. An overcoming force is necessary to cause disengagement and continued movement of the arms 36 and 38. The detents 54 are so placed as to indicate the correct volume of, for example, a 9 inch, 11 inch or 14 inch balloon. See FIGS. 4, 5 and 6. Therein, it will be seen that the template arms 36 and 38 form therebetween a space 60 of variable volume depending upon the placement of the arms 36 and 38 with respect to one another, more detail as to this feature will be delved into hereinafter.

Secured to base 4 in super position to retaining cover 46 is filling nozzle assembly 10. Assembly 10 merely comprises a filling pipe 62 of the type that is insertable into the valve member as disclosed in said aforecited pending application, and which is carried in the neck of a balloon, for example. Fill pipe 62 is supported by means of bracket 64 secured to base 4 by means of screws 66.

The bracket 64 is provided with coupling connection 68 to which a hose 70 is connected, the opposite end of the hose 70 terminating in a coupling connection 72 which in turn is in communication to valve assemblage 12.

Valve assemblage 12 is of the general type commonly found for metering gaseous fluids and in this instance comprises valve housing 74 defining a valve chamber wherein the valve element (not shown) is operated by manually actuable toggle lever 76. Valve housing 74 is secured to base 4 by means of screws 78 and is provided with gaseous intake coupling 80 by which means connection is made to the filling hose 82, through conventional couplings 84, helium high-pressure regulator 86 and ultimately to the cylinder of helium 32 shown having cover shroud 88 thereover.

The operation of the dispenser 2 and the inflation gauge aspect thereof will now be described in detail. After hook-up to a gaseous fluid supply for the device 2 has been made, an inflatable article, such as, for example, a balloon, having a valve element therein is held in readiness while the arms 36 and 38 are positioned relative to one another depending upon the size of the balloon to be inflated. For example, referring to FIGS. 4-6 inclusive, it is seen how the arms 36 and 38 forming the inflation gauge may be positioned to define a space 60, 9 inches, 11 inches or 14 inches across. If, for example, it is desired to inflate an 11 inch balloon, the arms 36 and 38 are moved to the intermediate positions whereat the spring wires 56 will drop into the grooves or detents 54 corresponding to this size.

The balloon with its valve is inserted onto the filling pipe 62 whereupon a snap-fit, frictional engagement occurs to securely retain the balloon and integral valve thereon. The operator then manually operates the toggle valve lever 76 to allow helium, for example, to flow from the helium tank through the valve assembly 12, the hose connection 70 and through filling nozzle or fill pipe 62 into the balloon until such time as the inflated balloon touches the inside surfaces of arms 36 and 38 or in other words, until the space 60 therebetween is taken up by the balloon which indicates that the balloon has been expanded to the 11 inch size. Obviously, the same operation will be performed where the template arms 36 and 38 are placed in the 9 inch or the 14 inch positions. After filling, the inflated balloon is removed.

Various modifications and variations will at once make themselves apparent to those of ordinary skill in the art. For example, the template arms 36 and 38 need not have the offset configuration as shown and described, and need not have the specific shape shown. Indeed, they may be simple upstanding rods and the specific means for obtaining their coaction need not be the specific rack and pinion shown. These as well as other variations will not depart from the spirit and scope of the invention as defined by the appended claims, and which are intended to be covered thereby.

Thus, there has been disclosed and described a dispenser for gaseous fluids having an inflation gauge suitable for indicating the extent of inflation for the inflatable article being inflated, which device is easily fabricated and is of essentially trouble-free operation.

We claim:

1. A dispenser for gaseous fluids and inflation gauge for inflatable articles comprising the combination of: a base; a filling nozzle supported from said base and adapted to receive the mouth of an article to be inflated; conduit means connected to said filling nozzle and adapted to be connected to a source of gaseous fluid; valve means operatively connected in said conduit means to put said source of gaseous fluid and said filling nozzle in communication; and an inflation gauge means movably and adjacently supported parallel to said filling nozzle to provide a visual indication of the degree of inflation of the inflatable article being inflated.

2. The dispenser in accordance with claim 1 wherein said base is adapted to be secured to a counter-like surface, or vertical partition.

3. The dispenser in accordance with claim 1 wherein said base is adapted to be mounted on a cylinder of gaseous fluid under high pressure.

4. The dispenser in accordance with claim 1 wherein said inflation gauge means comprises an upstanding arm operatively supported from said base and selectively movable from said filling nozzle in selected increments.

5. The dispenser in accordance with claim 4 wherein said upstanding arm is movable to and retained in a selected one of a plurality of calibrated positions.

6. The dispenser in accordance with claim 5 which additionally includes another of said upstanding arms oppositely positioned from said other arm with said filling nozzle being intermediate said arms.

7. The dispenser in accordance with claim 6 wherein said arms extend beyond the height of said filling nozzle a sufficient distance to form a confining space therebetween for the inflatable article being inflated.

8. The dispenser in accordance with claim 7 wherein said arms are laterally offset from one another, and vertically offset with respect to said base.

9. The dispenser in accordance with claim 8 wherein said arms are operatively connected to coact with the movement of each other through a rack and pinion arrangement.

10. The dispenser in accordance with claim 9 wherein said arms have spaced detents corresponding to selected inflatable article inflation sizes and spring means are provided to engage said arms and drop into frictional contact with said detents.

* * * * *